Figure 1:

United States Patent [19]

Ribadeau-Dumas et al.

[11] Patent Number: 5,580,601
[45] Date of Patent: Dec. 3, 1996

[54] GRAINY CONFECTIONERY PRODUCT AND PROCESS FOR MANUFACTURING THE SAID CONFECTIONERY PRODUCT

[75] Inventors: Guillaume Ribadeau-Dumas, Lambersart; Michel Serpelloni, Beuvry Les Bethune, both of France

[73] Assignee: Roquette Freres, Lestrem, France

[21] Appl. No.: 369,809

[22] Filed: Jan. 9, 1995

[30] Foreign Application Priority Data

Jan. 10, 1994 [FR] France ................................ 94-00167

[51] Int. Cl.$^6$ ............................................. A23G 3/00
[52] U.S. Cl. ............................................. 426/660; 426/804
[58] Field of Search ................................ 426/572, 659, 426/660, 103, 804

[56] References Cited

U.S. PATENT DOCUMENTS

| | | | |
|---|---|---|---|
| 4,323,588 | 4/1982 | Vink et al. | 426/564 |
| 4,408,041 | 10/1983 | Hirao et al. | 426/660 |
| 4,450,179 | 5/1984 | Vink et al. | 426/103 |
| 4,497,846 | 2/1985 | Boursier et al. | 426/660 |
| 4,597,981 | 7/1986 | Kastin | 426/660 |
| 4,840,797 | 6/1989 | Boursier | 426/103 |
| 4,911,937 | 3/1990 | Crosello et al. | 426/103 |
| 4,963,359 | 10/1990 | Haslwanter et al. | 426/440 |

FOREIGN PATENT DOCUMENTS

| | | |
|---|---|---|
| 0009325 | 4/1980 | European Pat. Off. . |
| 0273001 | 6/1988 | European Pat. Off. . |
| 0377278 | 7/1990 | European Pat. Off. . |
| 0533334 | 3/1993 | European Pat. Off. . |
| 2338651 | 8/1977 | France . |
| 2522936 | 9/1983 | France . |
| 55-68256 | 5/1980 | Japan . |
| 1583573 | 1/1981 | United Kingdom . |
| WO91/07100 | 5/1991 | WIPO . |

OTHER PUBLICATIONS

Hough, H. A.; Grenby, T. H. 'Development in sweetners' 1987, Elsevier Applied Science, London Chapter 4, Farby I, "Malbit and its applications in the food industry" *pp. 93–97*.

*Primary Examiner*—Jeanette Hunter
*Attorney, Agent, or Firm*—Larson and Taylor

[57] ABSTRACT

The invention relates to a new grainy confectionery product obtained using an appropriate quantity of maltitol or xylitol relative to the total sweetening component. It also relates to a process for the manufacture of the said confectionery product.

32 Claims, 4 Drawing Sheets

GRAINY CONFECTIONERY PRODUCT AND PROCESS FOR MANUFACTURING THE SAID CONFECTIONERY PRODUCT

The present invention relates to a new grainy confectionery product obtained by the use of a suitable amount of maltitol or xylitol, as well as to a process for manufacturing the said confectionery product.

The term "grainy confectionery product" denotes, to a person skilled in the art, a very special class of confectionery products which are always regarded as very exacting to produce. These products are partially crystallized and possess a complex physical structure which is comparable to that of a fine dispersion, but sometimes also to that of a foam or an emulsion.

Grainy confectionery products are fine dispersions on account of the presence in these products of very fine crystals which are undetectable to the taste buds of the tongue and uniformly distributed in a saturated sugary syrup comprising the soluble molecules. in the case of sugar confectionery, the microcrystals in question are composed of sucrose.

They may also be foams on account of the possible presence in these confectionery products of a gaseous network generally consisting of air bubbles and imparting to these articles a lower density than that of the vast majority of confectionery products. The aeration results from specific mechanical operations such as pulling, beating or the choice of particular and suitable ingredients, especially overrun agents.

Lastly, these confectionery products can also be oil-in-water type emulsions when the products contain fats. The fatty phase is then dispersed in the form of droplets in the continuous aqueous phase, and stabilized in general by the use of emulsifiers.

The confectionery products of the type which form the subject of the invention are usually characterized by a water content of between 3 and 20%, and in general between 7 and 15%, and by a short and non-runny texture which is soft and can be chewed without it sticking to the teeth and is, furthermore, light and melting. In contrast to chewing gums, these confectionery products dissolve completely without leaving any insoluble solid residue in the mouth.

Specifically, the grainy confectionery products which form the subject of the invention are, without the following list being limiting, fondants, grainy marshmallows, spun toffees or fudges, crystallized toffees, nougats, torrones, fudge chews, microcrystallized flavoured mousses, or marzipans.

These articles sometimes comprise garnishes such as peanuts, sesame seeds, chopped walnuts, almonds, puffed rice or coconut flakes, and in other cases, as filling agents, liqueurs, fatty fillings or chocolate pastes. It should be noted that these articles can, moreover, be used to garnish or cover other confectionery and chocolate products, and likewise biscuit products.

Non-grainy products, that is to say not containing a sweetener in the crystallized state, such as, for example, most soft toffees, soft nougats or crocants, traditional marshmallows such as chocolate marshmallows and marshmallow mice are, on the other hand excluded from the present invention. Chewing gums will also be excluded although they contain a crystalline phase, as well as confectionery articles containing only sweeteners in the crystallized state.

Nowadays, as regards confectionery and sweetmeats, new strong trends in consumption seem to be appearing. Notions of nutritional balance and healthy lifestyle are consciously or unconsciously being taken into account in today's food. Although the pleasure associated with sugar still remains very steadfast, a good many consumers want to avoid the problems associated with sugar consumption. To this end, confectioners have been induced to develop sugarless formulations in which polyols, sometimes referred to as sugar alcohols, find their rightful place on account of their innocuousness with respect to teeth and their low calorific value compared to sucrose.

One of the great difficulties from which the formulators of sugarless confectionery cannot escape is that of succeeding in manufacturing products which are in all respects similar to the traditional products, to the point of being mistaken for the latter, without having substantially to modify or make more complex the installations and procedures established in the industries. This also applies to the confectionery products which are the subject of the present invention.

Various documents testifying to active research in this direction are known. Special mention may be made of:

U.S. Pat. Nos. 4,597,981 and 4,963,359, both relating to sugarless soft confectionery products containing gelatin. These are not grainy on account of the absence of use of crystallizable sweetening molecules.

Patents FR 2,522,936, U.S. Pat. No. 4,323,588 and U.S. Pat. No. 4,450,179 relating to sugarless marshmallows and nougats or to sugarless soft articles containing a shell and a centre, obtained by combining non-crystallizable hydrogenated maltose syrup, marketed by the Applicant under the brand name LYCASIN® and crystallizable hydrogenated isomaltulose. There is a mention only of manufacturing feebly hygroscopic products which do not collapse on storage. Be this as it may, a short texture can be obtained by the use of hydrogenated isomaltulose only if, as the Applicant has observed, the concentration of this polyol is very high in the confectionery product. This results, besides the increase in the cost of the confectionery product, in the virtual obligation, because of the weak sweetening power of hydrogenated isomaltulose, to use intense sweeteners so as to obtain a sufficiently sweet taste. Thus, the products described in this document are not satisfactory from all standpoints.

French Patent Application No. 2,338,651, in which a new process is claimed for manufacturing soft sweets possessing a crystalline structure. This process is equally suitable for obtaining traditional products with sugar and sugarless products. Maltitol is not specifically mentioned among the many possible sugar substitutes. Xylitol is the preferred polyol on account of the sensation of freshness which it procures in the mouth. It is used as the one and only substitute for mixtures of sugar and glucose syrup. The Applicant has found that this does not prove possible with maltitol and that with xylitol, the products obtained are not completely satisfactory.

European Patent Application No. 377,278 relating to a dietary sweetening composition in which grainy chews containing essentially a combination of polydextrose and xylitol are described. The latter always represents at least 38% of the sweetening component, taken in the dry state. The same applies to polydextrose. Moreover, the most advantageous products obtained, from the standpoint of their texture and their stability, necessitate very high cooking temperatures in the region of 165° C., but also the overnight maturation of the cooked mass before it is worked again. It is understandable that the industrial establishment of such a batch process proves very exacting both from the technical and economic standpoints.

European Patent Application No. 9,325 relating to anti-caries compositions based on erythritol, and in particular fudges and marshmallows. The products obtained according to the examples given possess an unfortunate tendency to crystallize completely during storage and to acquire a rough and sandy texture in the mouth.

Patents EP 273,001 and U.S. Pat. No. 4,911,935 describing nougat-type products, obtained by adding a cooked syrup composed of hydrogenated glucose syrup and mannitol to a chilled product lacking mannitol but necessarily containing an insoluble cellulose and a soluble modified cellulose. In fact, the invention as described in Patent EP 273,001 is based on the use of native or modified celluloses in order to impart a sufficiently viscous structure to confectionery products containing a hydrogenated glucose syrup, so that the flow of these products on storage is rendered difficult and their unpleasant sticky character is lessened. There is no mention at all in this patent of preparing grainy confectionery products possessing a short and non-runny texture. Furthermore, native or modified celluloses tend unfortunately to generate, on cooking, spurious tastes and colorations and a rough character in the mouth, so that the proposed approach is unsatisfactory.

Patent JP 55,-68256 claiming crystallized soft sweets comprising lactose and fructose and optionally polyols to a maximum content of 20%. The use of maltitol is not envisaged.

Patent FR 2,499,576 relating to anhydrous maltitol crystals. The possibility of making a fondant is described therein. By reproducing the process given in Example 5 of this patent, a non-crystallized aerated paste rather than a fondant is obtained as observed by the Applicant. The product obtained has a texture which is sandy, runny, particularly sticky and very unpleasant in the mouth, not at all corresponding to the desired characteristics stated above and traditionally found for real fondants. Furthermore, the confectionery product thus obtained changes after a few weeks, to the point of no longer being consumable on account, it seems, of an uncontrolled and late crystallization of the maltitol within it into coarse crystals which can be detected by the taste buds in the mouth. This instability renders the product unmarketable.

Hence, at the present time, there are no technically or economically viable approaches that enable grainy confectionery products possessing the qualitative features stated above to be manufactured.

Having established that this was the situation, the applicant directed his attention towards remedying this deficiency while setting himself the essential objective of improving the sensory and textural qualities of such confectionery products to the point of resembling in all respects the existing sugar-based products. The applicant also sought to reduce as far as possible the modifications necessary, on conventional processing lines, for preparing the said sugarless confectionery products.

After many trials, the Applicant deservedly found, surprisingly and unexpectedly, that it was possible to prepare grainy maltitol or xylitol confectionery products, which are of excellent textural quality and are particularly stable over time, only when they contained 50 to 93% maltitol or xylitol relative to the total sweetening component, and only when either of these two polyols, present at least partially in the crystallized state in the confectionery product, was essentially in the form of crystals with a size of less than 60 microns, preferably less than 40 microns and still more preferably less than 20 microns.

The subject of the invention is therefore a sugarless grainy confectionery product, containing maltitol or xylitol, characterized in that the maltitol or xylitol constitute from 50 to 93% of the sweetening component and in that the maltitol or the xylitol present in the crystallized state are essentially, and preferably in an amount of at least 90%, in the form of crystals with a size of less than 60 microns.

The Applicant has found that there was an analogy with respect to behaviour between xylitol and maltitol and that if the crystals contained in the confectionery product have a needle shape, that is to say for example have a length of 120 microns and a cross-section of 35 microns, then the confectionery product tends to change rapidly and to harden excessively. This is not the case when it contains crystals, preferably of parallelepipedal shape, with a size of less than 60 microns. In this case, the grainy confectionery products are stable for several months. The crystals then have a high purity with respect to maltitol or xylitol, exceeding 95% and most often 98%, or even 99%.

The Applicant has found, furthermore, that when the content of either of these two polyols is low in the confectionery product, that is to say when it is less than 50% relative to the sweetening component considered in the dry state, a long and runny texture and a product having a tendency to stick to the wrapping paper are always obtained.

Conversely, when this content is high and exceeds 93% of the total sweetening component of the confectionery product, it was verified that a complete graining of the confectionery products is always observed over time. This is the case even when these polyols are crystallized within the confectionery product in the form of crystals with a size of less than 60 microns. A product which is brittle and very sandy in the mouth is obtained in this case. For very high maltitol or xylitol concentrations, a mass which is very fluid after cooking is obtained. This is especially true with xylitol. It then becomes very difficult to work this cooked mass on the machine. It is advisable, in order to remedy this problem, to increase cooking temperatures or to add viscosity enhancers such as natural or synthetic polysaccharides. This is not advantageous and for this reason it is preferable never to exceed the 93% content.

It is surprising to observe that, although maltitol and xylitol do not have the same solubility in water, it is necessary to choose for these two polyols very similar concentrations which are calculated relative to the total dry sweetening component.

It is therefore essential for either the maltitol or xylitol content to be neither too low nor too high in order that the texture of the grainy confectionery product shall be correct from the outset and consequently suitable for machine working, and in order that this texture shall not change during storage.

The exact maltitol or xylitol content will vary with the nature of the manufactured product, but also in accordance with the desired final texture. The latter may be adjusted by the choice of the other ingredients and by the water content of the confectionery product.

Generally speaking, the amounts needed will be smaller in the case of a chew than in the case of a hard nougat.

In practice, a total content by weight, expressed in terms of the sweetening component, preferably of between 55% and 91%, more preferably of between 60% and 85% and still better of between 65% and 80% will be adopted for either of these two polyols.

It is also possible to combine maltitol and xylitol or to add another crystalline polyol in order to control the crystallization. In this case, the content of at least maltitol or of at least xylitol should exceed 50% by weight of the sweetening component for graining to occur.

The optimal maltitol and xylitol content may readily be determined by a person skilled in the art, from the data above, by a few routine trials. It goes without saying that the adjustment of this content will be made by taking into consideration the type of industrial plant to be used and the method of manufacturing grainy confectionery products which may either be cast, moulded, cut or extruded.

According to the invention, the sweetening component constituting the grainy confectionery product will contain, apart from maltitol or xylitol, polyol syrups or oligosaccharide or polysaccharide syrups, preferably hydrogenated.

Polyol syrups are understood here to mean syrups of hydrogenated mono- and/or disaccharides, and especially those of xylitol, sorbitol and maltitol. Oligosaccharide or polysaccharide syrups designate in particular hydrogenated starch hydrolysates which are low in sorbitol and in maltitol, inulin and its derivatives, dextrins and their derivatives and especially dextrin hydrolysates, and the products commonly designated by the name "polydextrose" and polyglucoses.

The sweetening component will be for the minor part composed of the above syrups, alone or mixed, on the understanding that there is nothing to prevent the use of the same products in the dehydrated state or in the crystallized state, although the cost then becomes a limiting factor.

In order to control the crystallization of maltitol or xylitol and to obtain sufficiently fine crystals, it will be preferable to adjust the oligosaccharide and the polysaccharide contents in the grainy confectionery product in accordance with the invention. It was observed that contents representing, on a dry basis, about 4% to about 35% of the total sweetening component of the confectionery product considered in the dry state, and more preferably between 5% and 30% of this component, advantageously facilitate the formation of nuclei and avoid their changing into crystals of a size greater than 60 microns.

The sweetening component may comprise, as minor constituent items, viscosity enhancers such as gum arabic, water-activity modifiers such as glycerol or alternatively intense sweeteners such as aspartame or acesulfame.

In practice, this sweetening component, considered in the dry state, will represent from 60 to 96%, preferably from 70 to 90% and more preferably from 75 to 88% by weight of the confectionery product as marketed.

The grainy confectionery products of the invention, when they are, in particular, nougats, chews, toffees and grainy marshmallows, contain overrun agents in order to facilitate the creation of a structure comparable to that of a foam. These agents are proteins of animal or vegetable origin such as gelatin, milk proteins, fish proteins, gluten hydrolysates, soya bean proteins and egg-white albumin.

As regards gelatins, the capacity to give or not to give consistent gels, that is to say, for a person skilled in the art, the Bloom number, will be taken into account in relation to dosages. Thus, it will be preferable to select gelatins having very high Bloom numbers when it is desired to limit the protein intake or alternatively to obtain an elastic texture. There will also be nothing to prevent, on the contrary, the use of proteins as bulking products, such as, for example, in the case of dietary or pharmaceutical confectionery products. Gelatins having low Bloom numbers and milk and egg-white proteins will then preferably be selected.

These overrun agents will preferably represent 0.5 to 15% of the confectionery product as marketed.

The chews and nougats will also contain, as is customary for traditional formulations, fat in suitable proportions known to a person skilled in the art. As regards the nature thereof, it will preferably be a milk fat or a hydrogenated vegetable oil, from palm, copra or alternatively soya bean. For organoleptic reasons, these fats will advantageously possess a melting point which is substantially in the region of the buccal temperature, and will preferably be employed at a level of between 1 and 10%.

The use of an emulsifier will be optional, in particular when high protein contents are present. Nevertheless, in instances where fat is used in a not insignificant amount in the formulation of the confectionery products according to the invention, it will always be preferable to allow for its addition at a level of 0.1 to 2% relative to the confectionery product. This emulsifier may be chosen, in particular, from lecithins and fatty esters of glycerol, of sucrose or of sorbitol.

The grainy confectionery products in accordance with the invention possess, generally speaking, a water content of between 3 and 20%, preferably of between 4 and 14.5% and more preferably of between 5 and 13%. Fairly low values are selected for chews or nougats, and higher values for fondants or alternatively grainy marshmallows. It should be noted that, relative to traditional recipes, slightly lower water contents are generally chosen.

It is also possible to envisage, taking into account the high sweetening power of maltitol and xylitol, the introduction of substances with valuable nutritional or pharmacological properties such as minerals, vitamins, plant extracts, pharmaceutical active ingredients or alternatively essential fatty acids.

The grainy confectionery products according to the invention advantageously possess the feature of being able to be prepared according to the conventional processes already established in the confectionery industries. These processes may be methods necessitating cooking, or alternatively cold methods like the one described in Patent FR 2,338,651 mentioned above or the ones used for manufacturing chewing gums.

The conditions of manufacture should, however, be adjusted slightly so that the final water content of the confectionery products is between 3 and 20%.

Preferably, solubilization of crystalline maltitol or of crystalline xylitol and cooking, at a high temperature, of at least 75% of the sweetening component comprising, on a dry basis, from 50 to 93% of maltitol or xylitol are performed. The cooking temperature will, in the case of maltitol, be between 105° and 135° C. and preferably between 108° and 128° C. In the case of xylitol, the cooking temperature to be selected will be higher and between 110 ° and 150° C. and more preferably between 115° and 145° C. It is also possible to use a syrup with a very high content of maltitol or of xylitol instead of using these polyols in the crystalline state. The exact cooking temperature will vary according to the type of evaporator installed and in particular the level of vacuum applied, but also according to the type of confectionery product to be obtained. The other ingredients capable of participating in the composition of the confectionery product, such as flavourings, fats, viscosity enhancers, acidulating and colouring agents, emulsifiers, bulking agents and overrun agents, are then added to the cooked mass cooled to below the cooking temperature. These ingredients may be introduced in the form of solutions so as to facilitate their incorporation.

In a variant of the process, cooking of the sweetening mixture with the ingredients of the formulation which are not sensitive to heat treatment may also be performed.

The crystallization into crystals with a size of less than 60 microns needed for obtaining a short texture may be spontaneous. Simply cooling the cooked mass or simply transferring the latter mechanically is liable, in effect, to seed crystallization. However, preferably, the latter is induced by adding to the cooked sweetening mixture a maltitol or xylitol powder comprising crystals, preferably of parallelepipedal shape, with a diameter of less than 60 microns, or by adding a fondant comprising either of these two polyols in the crystallized state essentially in the form of crystals with a size of less than 60 microns. Whether in the case of a supply of a powder or of a fondant, the crystallization is preferably seeded by crystals which are as pure as possible, that is to say preferably of a purity exceeding 95% and preferably 98%, or even 99%, and which are as fine as possible, that is to say preferably with a size of less than 40 microns and still more preferably with a size of less than 20 microns. This addition may represent from 0.1 to 25% of the sweetening component of the confectionery product. The crystallization is preferably seeded at a temperature of less than 105° C. and more preferably of between 40° and 70° C. With maltitol, the appearance of very fine crystals generally occurs below 35° C.

Working of the cooked mass is then performed with the object of enabling the crystallization to be propagated but also possibly with the object of aerating it. An air-pressure beater or a pulling machine may, for example, be used. Care is taken to carry out this work on a machine at an appropriate temperature so that the viscosity of the mass is correct. This operation is conducted so as to obtain a confectionery product possessing a density relative to water generally of between 0.4 and 1.8, and preferably between 0.6 and 1.5. In the case of a grainy marshmallow, this value is, for the most part, between 0.4 and 0.8, whereas for a fudge, a nougat or a chew, it varies from 0.8 to 1.40 and in general approaches 1.05. It should be noted that this density should be slightly lower than that of a traditional confectionery product in order to obtain the desired result.

Lastly, the resulting mass, where appropriate cooled and matured, is shaped, for example by pouring into starch, or alternatively by extrusion or moulding followed by cutting up. The cooled articles are then wrapped.

According to a second method of manufacture, qualified as a cold process, on the one hand a powder or a fondant containing xylitol or maltitol crystals possessing the characteristics stated above, and on the other hand the complementary sweetening component introduced in the form of a concentrated syrup, will simply be mixed thoroughly in the correct proportions and at a temperature of between 45° and 90° C. The particle size of the powder is also chosen as fine as possible so that the confectionery product does not possess a sandy texture in the mouth. The dry matter content of the complementary sweetening syrup will preferably exceed 85%, and still better 90%. The other possible ingredients of the confectionery product will also be added. In this case, the overrun agents will also be introduced in the form of a syrup.

The step of aeration, if it is necessary, and the step of shaping according to this cold process are carried out as described above.

The grainy fondants in accordance with the invention can be used in the same manner as sucrose-based traditional fondants, for example, for filling or garnishing chewing gums, chocolates, confectionery products or biscuit-making products. They may also constitute confectionery products as such, for example when they are cast in moulds or in starch. They can, without risk, be sugar-coated, candied, sweetened or frosted using xylitol, maltitol or other polyol syrups or powders.

It was found, surprisingly, especially in the case of a formulation with maltitol, that the fondants in accordance with the invention can easily be reworked or recooked in order to adjust their texture or their taste. Thus, it is possible, in particular by heating under vacuum at a temperature of between about 40° and 75° C., either to concentrate these fondants without the risk of their crystalline phase disappearing completely, or to further reduce the size of the crystals which they contain. It is of course possible to exploit this advantage in various ways, for example to prepare, without resorting to a fondant gun, very creamy fondants.

Moreover, the grainy fondants of the invention, in fact like other grainy confectionery products, have the property of generating great freshness in the mouth when they are formulated with xylitol. This specific property, which distinguishes them from traditional fondants, may suit particularly well certain formulations of chocolate, chewing gum or biscuit confectionery products. When, on the contrary, it is desired to avoid this characteristic of freshness, it will be preferred to prepare grainy confectionery products based on maltitol instead of xylitol, or alternatively based on mixtures of maltitol and xylitol.

A better understanding of the invention will be gained from the examples which follow.

EXAMPLE 1

Preparation of Maltitol Fondants

Several maltitol fondants are prepared according to the formulation below in order to determine the ideal characteristics of the crystallization seed as well as the appropriate cooking temperatures. The maltitol constitutes about 70% of the total sweetening component, considered in the dry state, of the formulation.

| | |
|---|---|
| Maltitol powder MALTISORB ® P90 (99.8% purity) | 52.6% |
| Sorbitol syrup NEOSORB ® 70/70 | 32.2% |
| Water | 14.4% |
| Crystallization seed (maltitol powder) | 0.75% |

For that, the following procedure is followed:

Cooking of the MALTISORB® P90, NEOSORB® 70/70 and water mixture at the chosen temperature.

Beating of the cooked mixture with the aid of a planetary mixer until the temperature of the cooked mass reaches 47° C.

Addition of the crystallization seed.

Additional beating with the aid of the planetary mixer for 15 minutes.

The following cooking temperatures are chosen:
105° C. - 110° C. - 115° C. - 120° C. - 125° C.
and the following crystallization seeds are chosen:

MALTISORB® P90: (company ROQUETTE):
Under a microscope in polarized light, it is observed that this powder contains maltitol crystals in the form of needles with a length of about 120 microns and a cross-section of about 35 microns.

Finely ground MALTISORB® P90:
This powder contains essentially parallelepipedic crystals with a length of about 47 microns and a cross-section of about 23 microns.

MALTISORB® P200: (company ROQUETTE):
This powder essentially consists of crystals in the form of needles with a length of about 350 microns and a cross-section of about 82 microns.

AMALTY® MR100 (company TOWA):
Under a microscope, this maltitol powder, contrary to the preceding ones, does not polarize light, which indicates a lesser crystallization state. It consists essentially of parallelepipedal particles, rather cubic, with edges of about 10 microns.

Maltitol powder obtained according to the conditions of Example 2 of Patent FR 2,499,576:

For that, the conditions of the process described in Example 2 of the said patent, consisting in crystallizing the maltitol of a syrup having a dry matter content of 80%, a maltitol content, on a dry basis, of close to 92%, a sorbitol content, on a dry basis, of close to 1%, and a maltotriitol content, on a dry basis, of close to 4.6%, are reproduced exactly. 1% of anhydrous powdered maltitol crystals are added to the syrup as crystalline seeds and the syrup is allowed to cool gradually from 50° C. to 20° C. in three days, with stirring. After washing, the crystals are observed under a microscope in polarized light. It is observed that the powder thus obtained weakly polarizes light and consists essentially of large parallelepipedal crystals, rather cubic, with edges of about 100 microns for the smallest crystals. The large size of the crystals appears to be linked to the excessively slow crystallization according to this process.

The following results are obtained:

As regards the cooking temperatures:

Irrespective of the crystallization seeds used, the fondants obtained by cooking at 105° C. are soft, whereas those obtained at 125° C. are particularly hard. Thus, the first are suitable as filling whereas the second could constitute products to be sugar-coated.

For intermediate temperatures, creamy textures are obtained, the ideal being for the chosen formulation to choose a temperature close to 110° C.

As reqards the crystallization seeds:

Substantial differences are however already observed during and after manufacturing between the products prepared.

For the same cooking temperature, the products prepared with the crystallization seeds MALTISORB® P90, MALTISORB® P200 and maltitol powder according to Patent FR 2,499,576 have a firmer texture than the fondants obtained with the crystallization seeds ground MALTISORB® P90 and AMALTY® MR100.

During storage, at ambient temperature and humidity, the differences observed between the products become more pronounced.

After one week, the products manufactured with the seeds MALTISORB® P90 and P200 as well as the maltitol powder according to Patent FR 2,499,576 are particularly hard, brittle and sandy in the mouth.

In contrast, the products prepared with the ground MALTISORB® P90 seeds and AMALTY® MR100 became slightly firm but still have an ideal texture, which appears smooth and homogeneous in the mouth.

Four months later, the last two fondants are again tasted. They remained soft and of excellent quality. They have, for those prepared by cooking at 110° C., a water content close to 13.5%. These fondants, being themselves grainy confectionery products, can be used in the preparation of other types of confectionery products, in accordance with the invention.

EXAMPLE 2

Observation of Maltitol Fondants

The following three fondants prepared by cooking at 110° C. according to the formulation of Example 1 and stored for 5 months at room temperature in a closed glass container are observed under a microscope in polarized light and at a magnification of 548 times:

a fondant with AMALTY® MR100 seed a fondant with ground MALTISORB® P90 seed a fondant with MALTISORB® P90 seed Photos are taken for the three products. They are called FIG. 1, FIG. 2 and FIG. 3 respectively.

Figure 2:
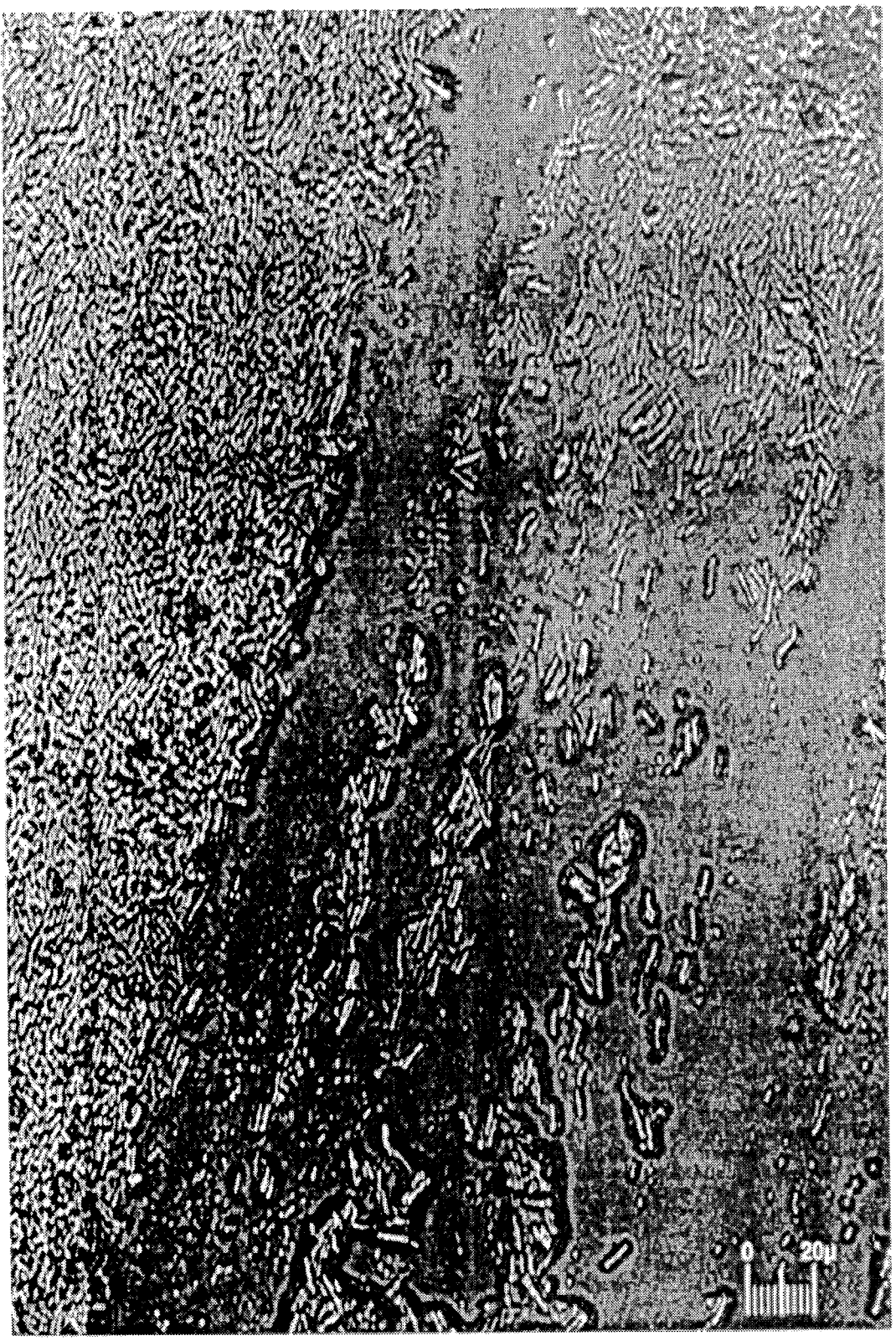

The two fondants judged to be very stable and prepared using AMALTY® MR100 and ground MALTISORB® P90 contain extremely fine crystals, with a size of less than 20 microns. The product with AMALTY® MR100 contains crystalline particles with a size of between 3 and 20 microns (FIG. 1). The one with ground MALTISORB® P90 contains even finer crystals with a size of between 3 and 12 microns (FIG. 2).

Figure 3:
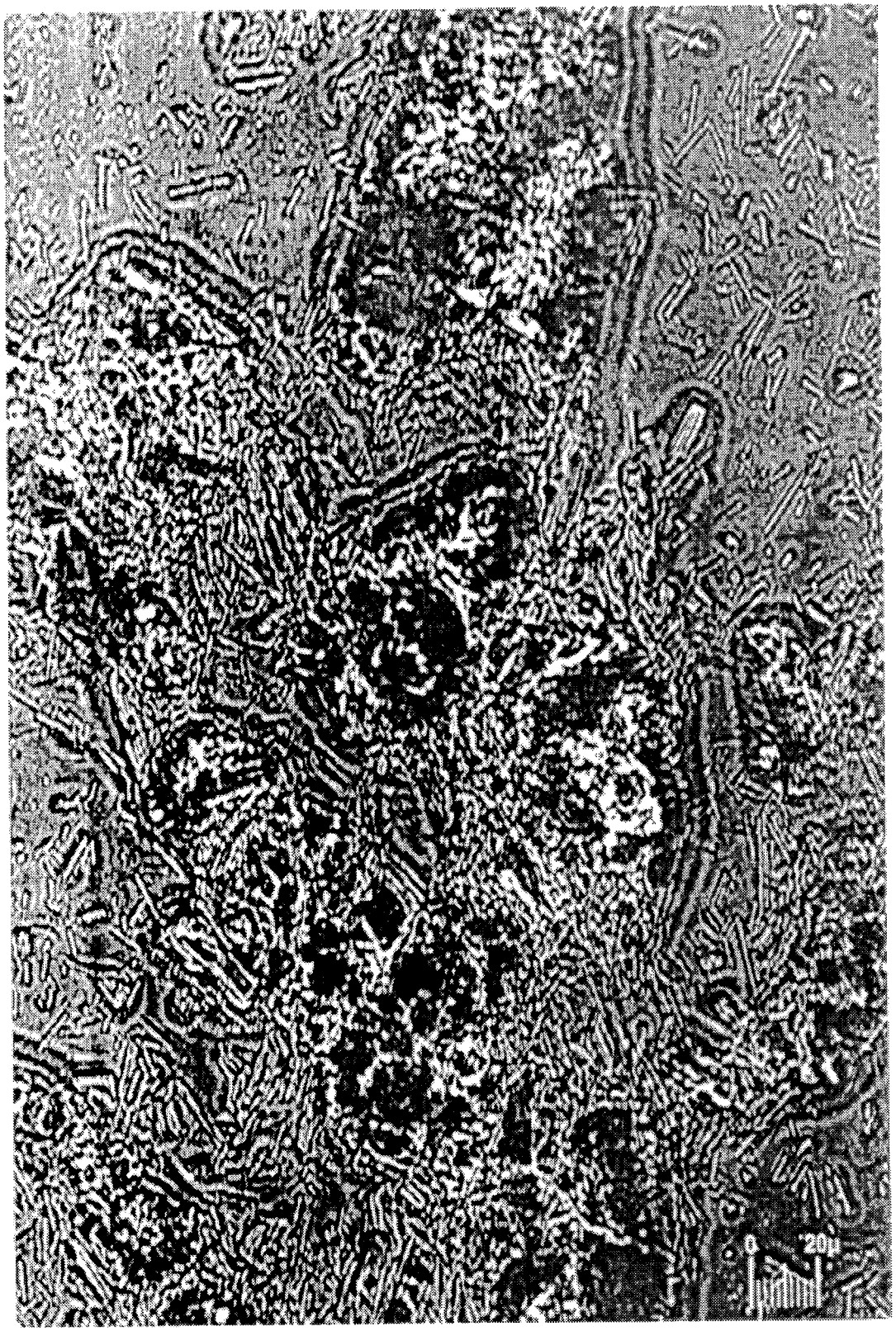

On the other hand, the fondant which is unstable to storage and sandy in the mouth, whose crystallization was seeded using MALTISORB® P90, has very large crystals but also very fine crystals (FIG. 3). The largest crystals are up to a size of 80 microns or even 100 microns.

EXAMPLE 3

Observation of a Prior Art Malitol Fondant

A product obtained by rigorously reproducing the manufacturing conditions described in Example 5 of Patent FR 2,499,576, is observed under a microscope in polarized light and at a magnification of 548 times. The maltitol constitutes about 77.5% of the sweetening component, considered in the dry state, of this formulation.

A product with a runny texture and which is particularly sticky is obtained. During its consumption, it appears sandy and faulty and consequently does not possess the desired characteristics.

Figure 4:
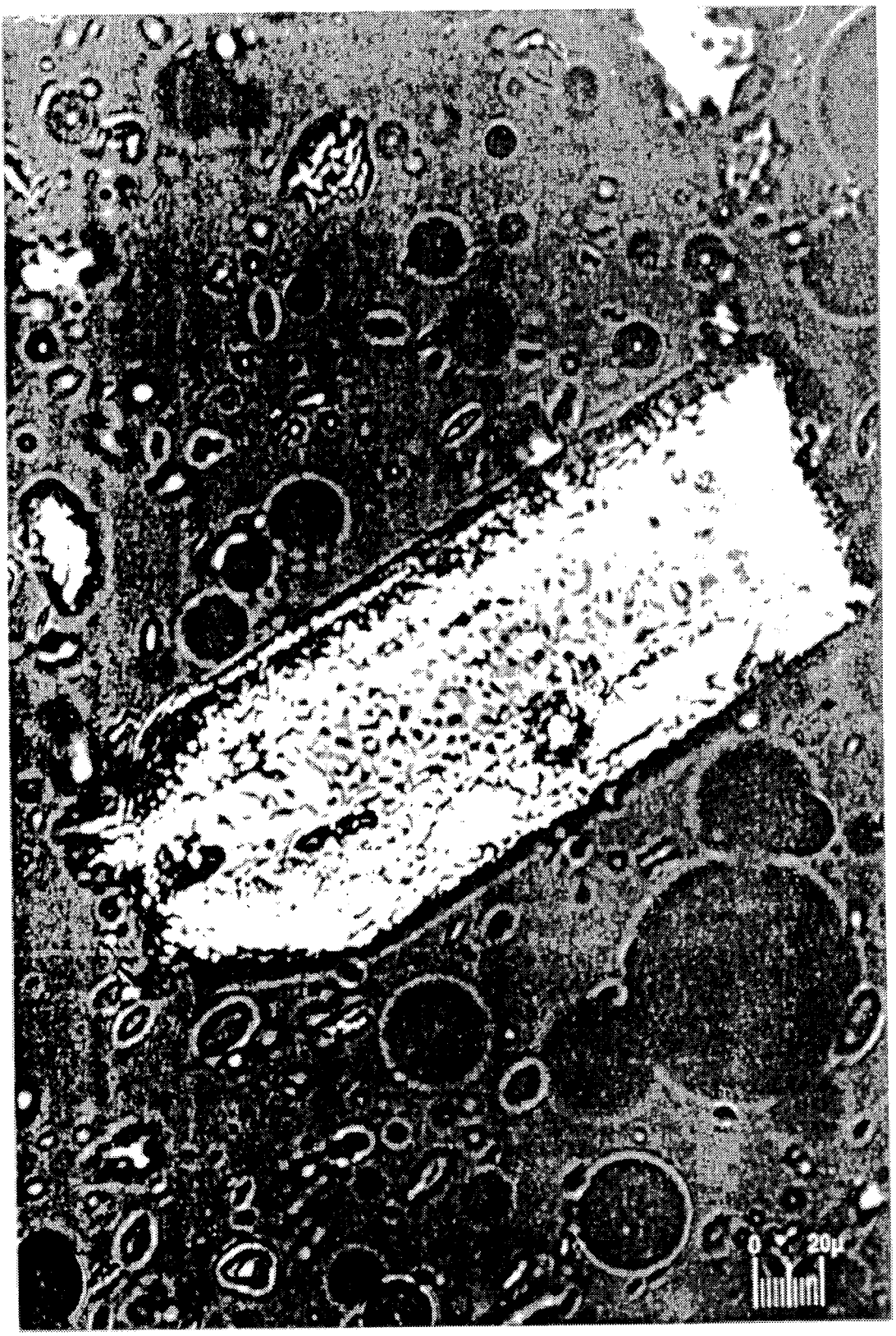

It is observed in FIG. 4 that the product contains crystalline particles whose size, for some of them, exceeds 230 microns. It also contains numerous air bubbles (black solid circles in FIG. 4).

EXAMPLE 4

Chews with Maltitol or Xylitol

The organoleptic quality and the stability of the three formulations of chews prepared with the aid of the following six crystalline polyols of high purity are compared: sorbitol, isomalt, mannitol, erythritol, xylitol and maltitol.

Formula A

| | |
|---|---|
| Sorbitol syrup NEOSORB ® 70/70 (DM: 70%) | 6,400 g |
| Crystalline polyol | 1,800 g |
| Milk proteins stripped of lactose | 1,120 g |
| Hydrogenated copra (melting point 32° C.) | 395 g |
| Glyceryl monostearate | 39 g |
| Solution of gelatin 180 Bloom (DM: 40%) | 196 g |
| Finely ground crystalline polyol as seed (diameter of the particles <50 microns) | 50 g |

The level of crystalline polyol relative to the sweetening component, expressed as dry matter/dry matter, is about 29%.

Formula B

The formulation is identical to formula A apart from the fact that:

the sorbitol syrup NEOSORB® 70/70 is added to the extent of 4,702 g instead of 6,400 g and the crystalline polyol is added to the extent of 2,988 g instead of 1,800 g.

The level of crystalline polyol relative to the sweetening component, expressed as dry matter/dry matter, is about 48%.

The formulation is, in this case as well, identical to that of formula A given above apart from the fact that:

the NEOSORB® 70/70 syrup is introduced only to the extent of 2,713 g, and the crystalline polyol is added to the extent of 4,381 g.

The level of crystalline polyol relative to the sweetening component, expressed as dry matter/dry matter, is close to 70%.

To prepare the chews, the following are performed using the formulae A, B and C:

cooking of the NEOSORB® 70/70 and crystalline polyol mixture at about 120° C. in the case of a disaccharide (isomalt, maltitol) and at about 140° C. in the case of a monosaccharide (sorbitol, mannitol, erythritol and xylitol), incorporation, during cooling of the cooked mixture, of the milk proteins at about 100° C., of the fat and the emulsifier at about 90° C., of the gelatin solution at about 85° C. and lastly of the polyol powder as crystallization seed at about 80° C., pulling of the resulting chew for one minute so as to obtain a density close to 1.04, and shaping and coating the chew and lastly wrapping of the product in sweet paper.

The water content of the products is close to 6.5% in all cases.

The chews obtained with the different polyols (18 in total) are stored for two months under ambient temperature and humidity conditions.

At the end of this time, the products are compared with one another. Special attention is paid to the tendency of the product to stick to the paper and its texture.

The products prepared according to formula A remain non-sticky and have a short texture only when erythritol or mannitol are used. With xylitol, maltitol and sorbitol, the products are clearly sticky immediately after manufacturing.

With formula B, the chews with isomalt and with mannitol are acceptable after manufacturing but tend rapidly to cake and to become sandy. The products with xylitol and maltitol are quite sticky and have a rather runny texture. When the latter are observed under a microscope, it is observed that they are insufficiently crystallized.

With formula C, the chews with sorbitol, mannitol, erythritol and isomalt crystallize very rapidly at the core and as a result become unconsumable. On the other hand, the chews with xylitol and maltitol have a perfect, very creamy texture which is preserved over time.

Upon testing, it appears that, among the few products having preserved an acceptable texture after two months of storage, the products according to formulation C with xylitol and maltitol are judged to be the best tastewise.

Example 5

Xylitol Chews

Another formulation of xylitol-based chew is prepared according to the procedure given in Example 4. The latter comprises before cooking:

| | |
|---|---:|
| Xylitol XYLISORB ® | 4,320 g |
| Maltitol syrup LYCASIN ® | 4,370 g |
| Gelatin (solution at 26% DM) | 40 g |
| Copra (melting point 32° C.) | 60 g |
| Glyceryl monostearate | 10 g |
| Xylitol XYLISORB ® (99% purity), very finely ground (size of less than 20 microns) | 40 g |

After cooking, the water content of this chew is close to 5.2%. Its xylitol content relative to the total sweetening component, expressed as dry matter/dry matter, is close to 58%.

This chew is tasted immediately after manufacture. It has a very short, non-sticky texture, characteristic of a quality traditional chew. Furthermore, it is very sweet, exhibits a very high mouth freshness and is very creamy in the mouth.

This product is observed under a microscope. It has a microcrystallized structure. It is observed that it is composed of numerous crystals bathing in a syrup. These crystals exist in the form of very fine particles with a length of not more than 15 microns and a diameter of less than 5 microns. The exceptional quality of this chew, which can be manufactured continuously, can be easily reproduced, as observed by the Applicant, if the oligo- and polysaccharide content of the chew is between 4 and 35% relative to the sweetening component, expressed as dry matter/dry matter.

We claim:

1. Grainy confectionery product comprising a sweetening component containing maltitol, wherein the maltitol constitutes from 50 to 93% by weight of the sweetening component, and wherein the maltitol present in the crystallized state in said confectionery product is essentially in the form of crystals with a size of less than 60 microns.

2. Confectionery product according to claim 1 wherein the maltitol constitutes 55 to 91% of said sweetening component.

3. Confectionery product according to claim 1 wherein the maltitol constitutes 60 to 85% of said sweetening component.

4. Confectionery product according to claim 1 wherein the maltitol present in the crystallized state in said confectionery product is essentially in the form of crystals with a size of less than 40 microns.

5. Confectionery product according to claim 1 wherein the maltitol present in the crystallized state in said confectionery product is essentially in the form of crystals with a size of less than 20 microns.

6. Confectionery product according to claim 1 having a density relative to water between 0.4 and 1.8.

7. Confectionery product according to claim 16 having a density relative to water between 0.6 to 1.5.

8. Confectionery product according to claim 1 containing a fat and an emulsifier to the extent of 1 to 10% and 0.1 to 2% respectively.

9. Confectionery product according to claim 1 having a water content between 3 and 20%.

10. Confectionery product according to claim 9 having a water content between 4 to 14.5%.

11. Confectionery product according to claim 10 having a water content between 5 and 13%.

12. Confectionery product according to claim 1 wherein the sweetening component further comprises at least one product chosen from polyols, oligosaccharides and polysaccarides, optionally combined with an intense sweetener, a viscosity enhancer or a water-activity modifying agent.

13. Confectionery product according to claim 12 wherein the oligosaccharides and polysaccharide content represents, on a dry basis, about 4% to about 35% of the total sweetening component of the confectionery product considered in a dry state.

14. Confectionery product according to claim 13 wherein the oligosaccharide and polysaccharide content represents, on a dry basis, about 5% to about 30% of the total sweetening component of the confectionery product considered in a dry state.

15. Grainy confectionery product comprising a sweetening component containing xylitol, wherein the xylitol constitutes from 50 to 93% by weight of the sweetening component, and wherein the xylitol present in the crystallized state in said confectionery product is essentially in the form of crystals with a size of less than 60 microns.

16. Confectionery product according to claim 15 wherein the xylitol constitutes 55 to 91% of said sweetening component.

17. Confectionery product according to claim 15 wherein the xylitol constitutes 60 to 85% of said sweetening component.

18. Confectionery product according to claim 15 wherein the xylitol present in the crystallized state in said confectionery product is essentially in the form of crystals with a size of less than 40 microns.

19. Confectionery product according to claim 15 wherein the xylitol present in the crystallized state in said confectionery product is essentially in the form of crystals with a size of less than 20 microns.

20. Confectionery product according to claim 15 having a density relative to water between 0.4 and 1.8.

21. Confectionery product according to claim 20 having a density relative to water between 0.6 to 1.5.

22. Confectionery product according to claim 15 containing a fat and an emulsifier to the extent of 1 to 10% and 0.1 to 2% respectively.

23. Confectionery product according to claim 15 having a water content between 3 and 20%.

24. Confectionery product according to claim 23 having a water content between 4 to 14.5%.

25. Confectionery product according to claim 24 having a water content between 5 and 13%.

26. Confectionery product according to claim 15 wherein the sweetening component further comprises at least one product chosen from polyols, oligosaccharides and polysaccharides, optionally combined with an intense sweetener, a viscosity enhancer or a water-activity modifying agent.

27. Confectionery product according to claim 26 wherein the oligosaccharide and polysaccharide content represents, on a dry basis, about 4% to about 35% of the total sweetening component of the confectionery product considered in a dry state.

28. Confectionery product according to claim 27 wherein the oligosaccharide and polysaccharide content represents, on a dry basis, about 5% to about 30% of the total sweetening component of the confectionery product considered in a dry state.

29. Process for the manufacture of a confectionery product according to claim 1 comprising the steps of:

cooking at a high temperature, at least 75% of the sweetening component comprising maltitol in the solubilized state, adding to the cooked mass 0.1 to 25% of a powder or of a fondant comprising maltitol essentially crystallized in the form of crystals with a size of less than 60 microns, working the resulting mass so as to allow propagation of the crystallization of the maltitol and optionally so as to aerate it, before shaping it and wrapping the confectionery product thus obtained.

30. Process for the manufacture of a confectionery product according to claim 2 comprising the steps of:

cooking at a high temperature, at least 75% of the sweetening component comprising xylitol in the solubilized state, adding to the cooked mass 0.1 to 25% of a powder or of a fondant comprising xylitol essentially crystallized in the form of crystals with a size of less than 60 microns, working the resulting mass so as to allow propagation of the crystallization of the xylitol and optionally so as to aerate it, before shaping it and wrapping the confectionery product thus obtained.

31. Process for the manufacture of a confectionery product according to claim 1 comprising the steps of:

intimately mixing in suitable proportions and at a temperature of between 45° C. and 90° C., on the one hand, a powder or a fondant containing maltitol crystals with a size of less than 60 microns and, on the other hand, an additional sweetening component in the form of a concentrated syrup, working the resulting mass so as to allow propagation of the crystallization of the maltitol and optionally so as to aerate it, before shaping it and wrapping the confectionery product obtained.

32. Process for the manufacture of a confectionery product according to claim 2 comprising the steps of:

intimately mixing in suitable proportions and at a temperature of between 45° C. and 90° C., on the one hand, a powder or a fondant containing maltitol crystals with a size of less than 60 microns and, on the other hand, an additional sweetening component in the form of a concentrated syrup, working the resulting mass so as to allow propagation of the crystallization of the xylitol and optionally so as to aerate it, before shaping it and wrapping the confectionery product obtained.

* * * * *